Figure 1:
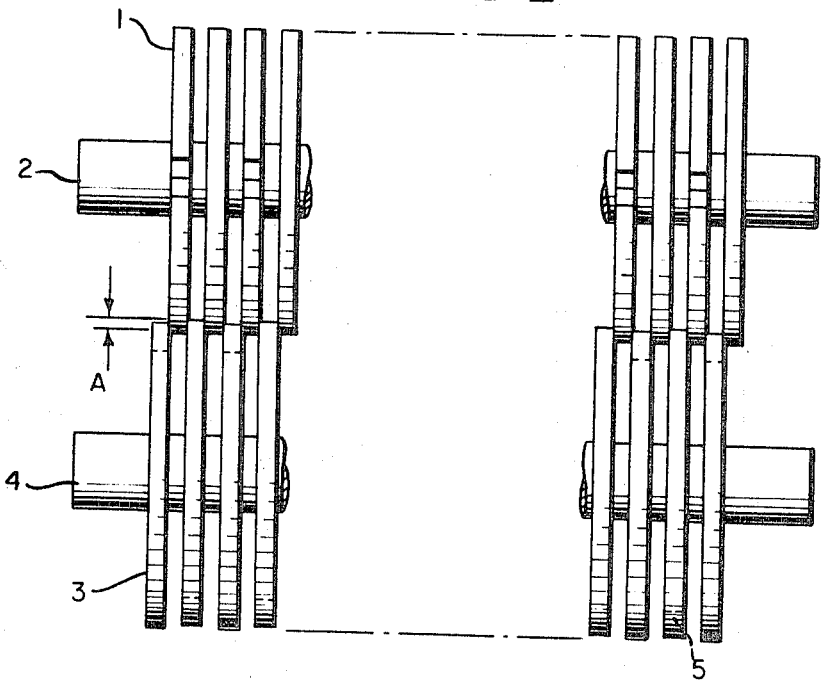
Figure 2:
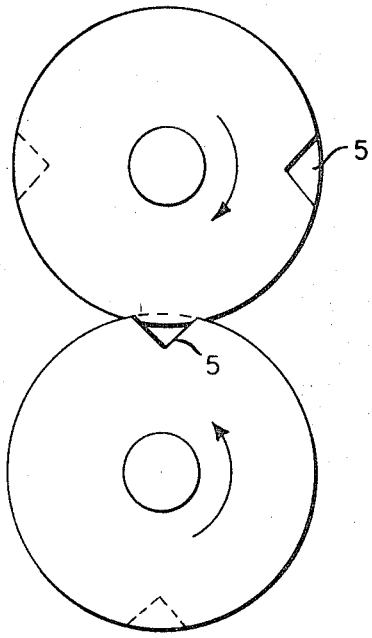
Figure 3:
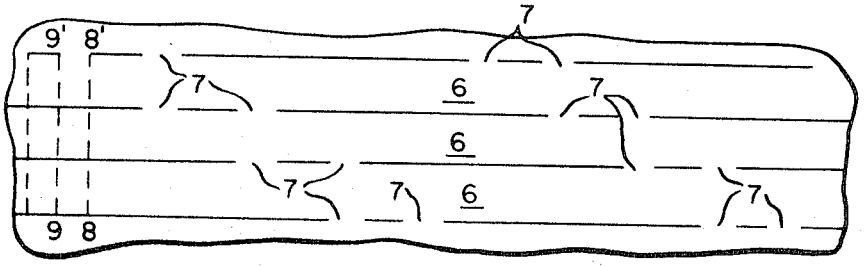

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 5, 1973

911 O.G. 7

T911,003

GRANULATION SLITTER

Louis Eugene Himelreich, Jr., Louisville, Ky., assignor to E. I. du Pont de Nemours and Company, Wilmington, Del.

Filed Apr. 6, 1972, Ser. No. 241,682
Int. Cl. B26d *1/24*
U.S. Cl. 83—675
1 Sheet Drawing. 3 Pages Specification

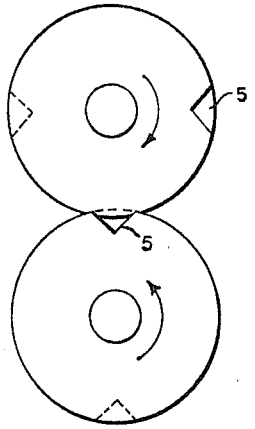

An improved rotary slitter wherein circular intermeshed slitting discs are notched. The slitter periodically leaves an uncut portion of the feed material, forming filaments which are interconnected.

June 5, 1973 L. E. HIMELREICH, JR T911,003

GRANULATION SLITTER

Filed April 6, 1972